(12) United States Patent
Aagaard et al.

(10) Patent No.: US 10,677,307 B2
(45) Date of Patent: Jun. 9, 2020

(54) BARREL SPRING

(71) Applicant: Microsoft Technology Licensing, LLC, Redmond, WA (US)

(72) Inventors: Karsten Aagaard, Monroe, WA (US); Errol Mark Tazbaz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/961,572

(22) Filed: Apr. 24, 2018

(65) Prior Publication Data

US 2019/0323573 A1    Oct. 24, 2019

(51) Int. Cl.
*F16F 3/02* (2006.01)
*F16F 1/18* (2006.01)
(Continued)

(52) U.S. Cl.
CPC ............ *F16F 3/023* (2013.01); *E05D 7/00* (2013.01); *E05F 1/1284* (2013.01); *F16C 11/12* (2013.01);
(Continued)

(58) Field of Classification Search
CPC .... F16F 1/18; F16F 1/185; F16F 1/187; F16F 1/027; F16F 3/023; F16F 2224/0208;
(Continued)

(56) References Cited

U.S. PATENT DOCUMENTS 1,156,859 A * 10/1915 Hamilton ................ F16F 3/023
  267/165
3,065,288 A * 11/1962 Smith ..................... H01M 6/02
  429/66

(Continued)

FOREIGN PATENT DOCUMENTS

CN         106224419 A    12/2016
DE       202004017617 U1   2/2005
(Continued)

OTHER PUBLICATIONS

Vasanth, et al, "Design and Parametric Optimization of Heavy Duty Leaf Spring", In International Journal of Engineering and Computer Science, vol. 4, Issue 5, May 2015, pp. 12216-12223.
(Continued)

*Primary Examiner* — Thomas J Williams
(74) *Attorney, Agent, or Firm* — Ray Quinney & Nebeker P.C.; Paul N. Taylor (57) ABSTRACT

A device for applying an axial force includes a longitudinal axis with a first compression surface located at a first end of the longitudinal axis and a second compression surface located at a second end of the longitudinal axis. A plurality of resilient members is positioned between the first compression surface and the second compression surface. A first resilient member is oriented with a first end proximate the first compression surface and a second end proximate the second compression surface. A second resilient member is oriented with a first end proximate the first compression surface and a second end proximate the second compression surface (Continued)

surface. The device has a compressed state and an expanded state where the first compression surface and second compression surface move in a direction of the longitudinal axis between the compressed state and the expanded state.

20 Claims, 7 Drawing Sheets

(51) Int. Cl.
*F16C 11/12* (2006.01)
*E05D 7/00* (2006.01)
*E05F 1/12* (2006.01)
*G06F 1/16* (2006.01)

(52) U.S. Cl.
CPC ............ *F16F 1/187* (2013.01); *G06F 1/1616* (2013.01); *G06F 1/1681* (2013.01); *E05Y 2201/48* (2013.01); *E05Y 2900/606* (2013.01); *F16F 1/18* (2013.01); *F16F 2224/0208* (2013.01); *F16F 2224/0258* (2013.01); *F16F 2228/007* (2013.01); *F16F 2236/027* (2013.01); *F16F 2238/022* (2013.01)

(58) Field of Classification Search
CPC ........... F16F 2236/027; F16F 2228/007; F16F 2224/0258; F16F 2238/022; F16F 2224/0266; G06F 1/1681; G06F 1/1616; E05F 1/1284; E05D 7/00; F16C 11/12; E05Y 2201/48; E05Y 2900/606
USPC .......................................... 267/160, 164, 165
See application file for complete search history.

(56) References Cited

U.S. PATENT DOCUMENTS

| | | | |
|---|---|---|---|
| 3,757,932 A | | 9/1973 | Baljet et al. |
| 3,879,025 A | * | 4/1975 | Dillard ...................... F16F 1/02 267/165 |
| 4,181,216 A | | 1/1980 | Cipu |
| 4,515,286 A | | 5/1985 | Ushikubo |
| 4,553,393 A | | 11/1985 | Ruoff et al. |
| 5,149,066 A | * | 9/1992 | Snaith ....................... F16F 7/14 248/636 |
| 5,632,473 A | * | 5/1997 | Dias Magalhaes Queiroz ............ A47C 23/002 267/103 |
| 6,113,082 A | * | 9/2000 | Fujino .................. A47C 23/002 267/103 |
| 7,275,286 B2 | * | 10/2007 | Lu .......................... G06F 1/1616 16/332 |
| 7,458,172 B2 | * | 12/2008 | Aveni ................... A43B 13/183 267/144 |
| 7,979,936 B2 | * | 7/2011 | Aveni ................... A43B 13/183 12/142 P |
| 8,678,867 B2 | | 3/2014 | Glick et al. |
| 9,103,397 B2 | | 8/2015 | Maas |
| 9,864,415 B2 | | 1/2018 | Siddiqui |
| 2006/0064900 A1 | | 3/2006 | Aveni |
| 2009/0115289 A1 | | 5/2009 | Asada |
| 2010/0301531 A1 | * | 12/2010 | Delahousse ............ A47C 7/027 267/165 |
| 2015/0035290 A1 | | 2/2015 | McGill et al. |

FOREIGN PATENT DOCUMENTS

| | | |
|---|---|---|
| WO | 92019838 A1 | 11/1992 |
| WO | 2011125488 A1 | 10/2011 |

OTHER PUBLICATIONS

"International Search Report and Written Opinion Issued in PCT Application No. PCT/US2019/026212", dated Aug. 2, 2019, 12 Pages.

* cited by examiner

BARREL SPRING

BACKGROUND

Background and Relevant Art

Springs and other elastic devices provide a restorative force when displaced from their relaxed state. Different spring designs provide for different ranges of spring constants and different directions and amounts of compression and/or extension. Coil springs may allow for larger operational ranges of compression and/or extension while providing comparatively lower spring constants.

Other springs, such as Belleville springs and leaf springs provide larger spring constants, providing larger forces with less displacement needed. However, the maximum compression and/or extension length for Belleville springs and leaf springs is limited relative to a width of the spring. Increasing the compression and/or extension length for Belleville springs and leaf springs causes the deformation of the spring material in or near the plastic deformation range or yield strength of the material. This results in fatigue and failure of the part.

Modern electronic devices are becoming increasingly portable with a growing importance on small form factors and light weight. Conventional coil springs do not provide the forces needed for the housing of electronic devices in the small spaces available. Conversely, Belleville springs and leaf springs may provide the required force, but may have shorter operational lifetime.

BRIEF SUMMARY

In some implementations, a device for applying an axial force includes a longitudinal axis with a first compression surface located at a first end of the longitudinal axis and a second compression surface located at a second end of the longitudinal axis. A plurality of resilient members is positioned between the first compression surface and the second compression surface. A first resilient member is oriented with a first end proximate the first compression surface and a second end proximate the second compression surface. A second resilient member is oriented with a first end proximate the first compression surface and a second end proximate the second compression surface. The device has a compressed state and an expanded state where the first compression surface and second compression surface move in a direction of the longitudinal axis between the compressed state and the expanded state.

In other implementations, a device for applying an axial force includes a longitudinal axis with a first end cap located at a first end of the longitudinal axis and a second end cap located at a second end of the longitudinal axis. A plurality of resilient members is positioned between the first end cap and the second end cap. A first resilient member is oriented with a first end proximate the first end cap and a second end proximate the second end cap. A second resilient member is oriented with a first end proximate the first end cap and a second end proximate the second end cap. The device has a compressed state and an expanded state where the first end cap and second end cap move in a direction of the longitudinal axis between the compressed state and the expanded state.

In yet other implementations, a system for movably coupling two structures includes a shaft having a rotational axis, a protrusion extending from the shaft in a radial direction, a link in contact with the protrusion, and a barrel spring contacting the link and configured to apply a force to the link toward the shaft. The link is positioned to contact a side of the protrusion and apply a torque to the shaft. The barrel spring includes a longitudinal axis with a first compression surface located at a first end of the longitudinal axis and a second compression surface located at a second end of the longitudinal axis. A plurality of resilient members is positioned between the first compression surface and the second compression surface. A first resilient member is oriented with a first end proximate the first compression surface and a second end proximate the second compression surface. A second resilient member is oriented with a first end proximate the first compression surface and a second end proximate the second compression surface. The device has a compressed state and an expanded state where the first compression surface and second compression surface move in a direction of the longitudinal axis between the compressed state and the expanded state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a perspective view of a hinge including a barrel spring in an open state;

FIG. 2-2 is a perspective view of the hinge of FIG. 2-1 in a closed state;

DETAILED DESCRIPTION

This disclosure generally relates to devices, systems, and methods for applying an axial force with an elastic device. More particularly, the present disclosure relates to providing a comparatively high amount of force in a small displacement and in small external dimensions (i.e., packaging). In some implementations, the elastic device may include a plurality of elastic or resilient members that may deform within an elastic deformation region of the material properties of the resilient member. The resilient members may be oriented generally longitudinally while deforming or bowing in a direction perpendicular to the longitudinal direction. Orienting the plurality of resilient members generally in a longitudinal direction of the elastic device may allow the plurality of resilient members to apply a greater amount of force than oriented perpendicular to the longitudinal direction.

In some implementations, an elastic device according to the present disclosure may be a barrel spring with a plurality of resilient members oriented in a longitudinal direction between a first compression surface and a second compression surface. In some implementations, the resilient members may elastically deform in a radial direction (perpendicular to a longitudinal axis of the device) when the barrel spring is exposed to a longitudinal compression. The radial deformation of the resilient members may be oriented inward toward the longitudinal axis, outward away from the longitudinal axis, or a combination of inward and outward.

For example, at least a portion of a resilient member may bow outward with a center portion of the resilient member moving away from the longitudinal axis during compression of the barrel spring. In other examples, at least a portion of a resilient member may bow inward toward the longitudinal axis during compression of the barrel spring. In yet other examples, at least a portion of the resilient member may bow inward, and another portion of the resilient member may bow outward (e.g., forming an S-shape), during compression of the barrel spring. In further examples, at least one resilient member of the barrel spring may bow inward, and another resilient member may bow outward, during compression of the barrel spring.

In some implementations, a barrel spring may provide a greater spring constant than a conventional coil spring in a small space and may provide greater operational lifetime than a conventional Belleville spring in a small space. In at least one example, a barrel spring including a plurality of generally longitudinally oriented resilient members may have a spring constant of greater than 150 Newtons per millimeter (N/mm) over a displacement of less than 500 microns (μm) and external dimensions of less than 3 mm in longitudinal length and less than 3 mm in width. In some embodiments, a barrel spring according to the present disclosure may provide over 60 N of force over a 400 μm displacement. Conventional coil springs of similar dimensions have a spring constant approximately an order of magnitude less. Belleville springs (or stacks of Belleville springs) with a similar spring constant may move through a plastic deformation and/or fatigue during usage, rendering the operational cycle lifetime of the Belleville Springs approximately an order of magnitude less.

Figure 1:
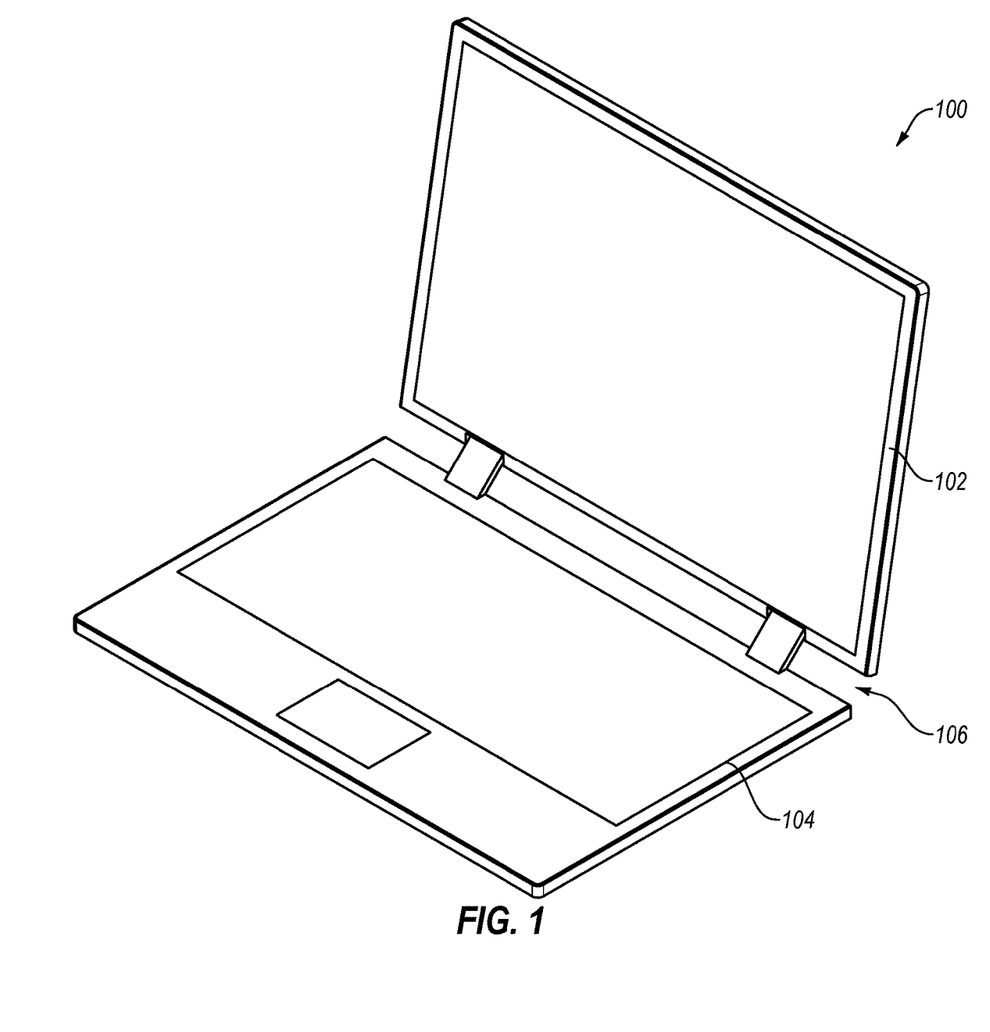
FIG. 1 is a perspective view of an electronic device.

FIG. 1 is a perspective view of an electronic device 100 having a first portion 102 and a second portion 104 with a hinge 106 positioned therebetween to movably connect the first portion 102 and second portion 104. The hinge 106 may include one or more barrel springs according to the present disclosure that provide a biasing force to bias the hinge 106 open, closed, or at any rotational position of the first portion 102 relative to the second portion 104. For example, one or more barrel springs may bias the hinge 106 open while a latch or other retention mechanism holds the electronic device 100 closed such that upon releasing the latch, the hinge 106 may urge the first portion 102 and second portion 104 apart from one another. In other examples, one or more barrel springs may bias the electronic device 100 closed, such that a latch is not used, and the first portion 102 and second portion 104 may be moved apart when a bias force of the one or more barrel springs is overcome by a user.

Figure 21:
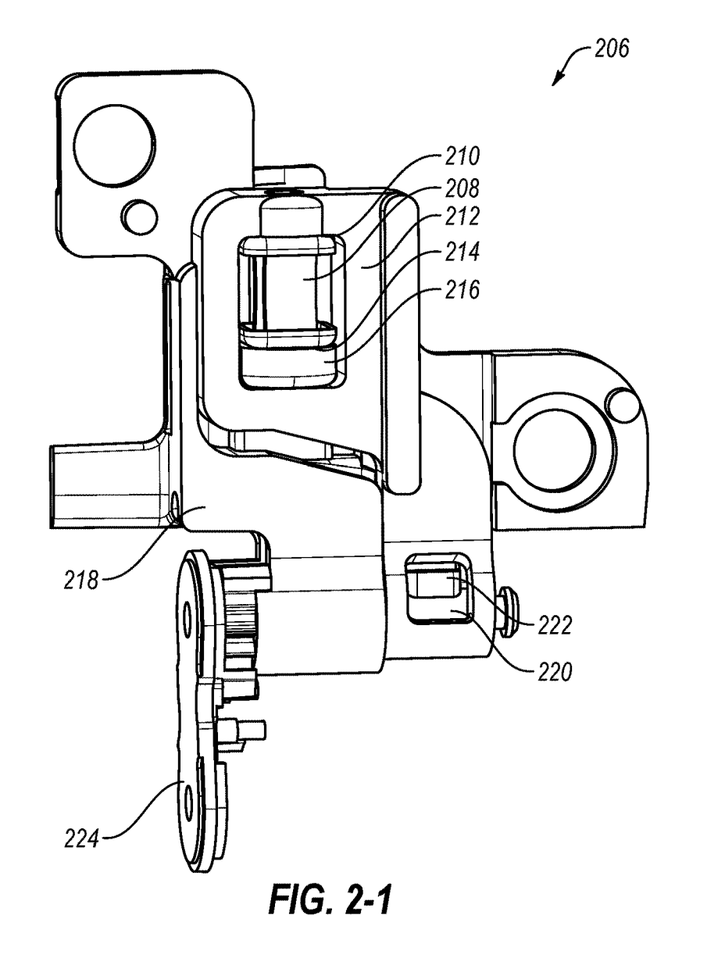
Figure 22:
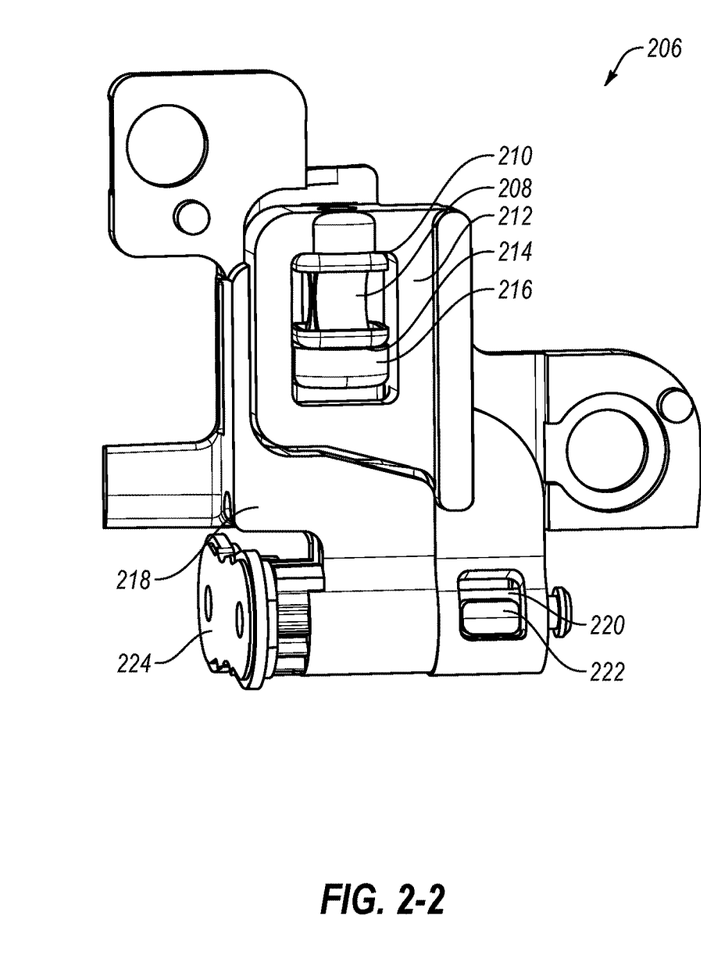

FIGS. 2-1 and 2-2 are perspective views of an implementation of a hinge 206 including a barrel spring 208, where the hinge 206 is in an open state and a closed state, respectively. FIG. 2-1 illustrates a hinge 206 having a barrel spring 208 positioned in the open state. The barrel spring 208 may be positioned with a first compression surface 210 in contact with a link 212 and a second compression surface 214 in contact with a post 216. The post 216 may be fixed relative to a frame 218. In some implementations, the frame 218 may be configured to connect to one of the first portion or second portion of an electronic device.

The frame 218 may support the link 212 such that the link 212 may translate in a longitudinal direction of the barrel spring 208 as the barrel spring 208 moves between an expanded state (shown in FIG. 2-1) and a compressed state (shown in FIG. 2-2). The translation of the link 212 relative to the frame 218 may further allow the translation of the link 212 relative to a shaft 220 supported by the frame 218. The shaft 220 may rotate about a rotational axis relative to the frame 218. In some implementations, the shaft 220 may have a protrusion 222 extending radially from the shaft 220 (e.g., away from the rotational axis of the shaft 220) that may engage with the link 212. For example, the protrusion 222 may move with the shaft 220 as the shaft 220 rotates, contacting the link 212 and translating the link 212 relative to the shaft 220 and frame 218. The translation of the link 212 relative to the frame 218 may compress the barrel spring 208 between the post 216 and the link 212, as shown in FIG. 2-2.

FIG. 2-2 illustrates the hinge 206 in a closed position. A connector 224 may be rotationally fixed relative to the shaft 220. In some implementations, the frame 218 may be connected to a first portion of an electronic device and the connector 224 may be connected to a second portion of the electronic device. As the shaft 220 rotates, the protrusion 222 may pull on the link 212, compressing the barrel spring 208. The barrel spring 208 may compress elastically, applying a force in the opposite direction to the link 212. The barrel spring 208 may, through the link 212 and protrusion 222, apply a torque to the shaft 220 to urge the hinge 206 toward the open state.

Figure 3:
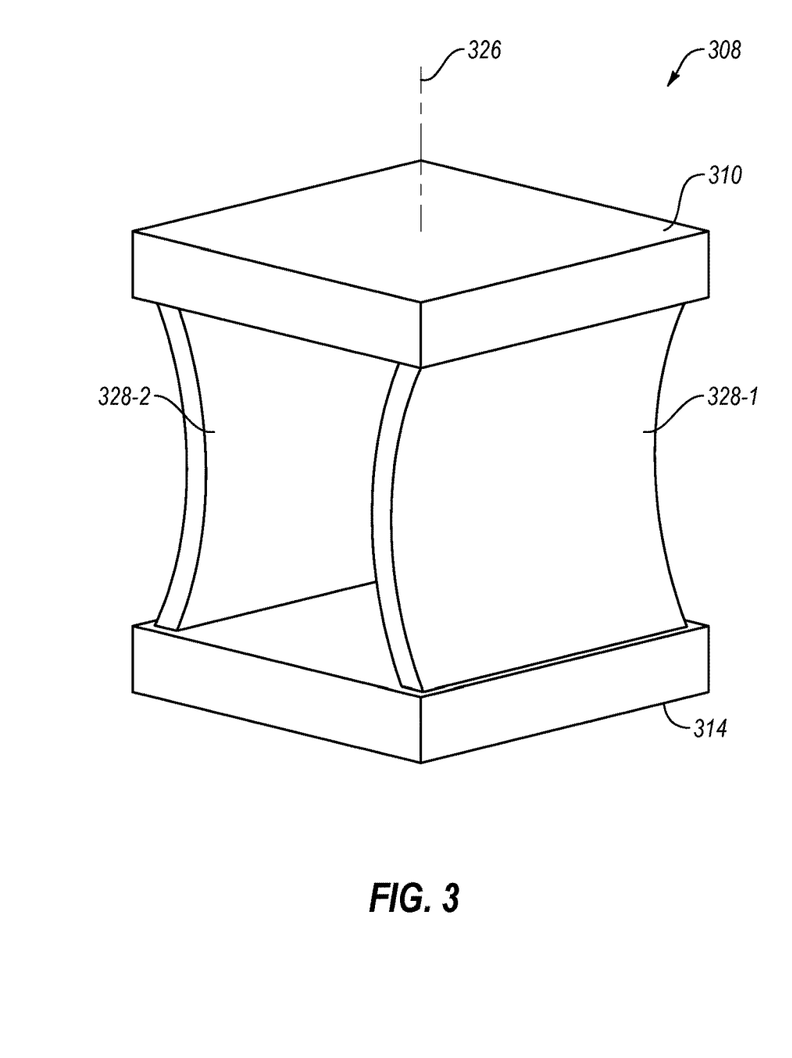
FIG. 3 is a perspective view of a barrel spring with inward compression.

FIG. 3 is a perspective view of an implementation of a barrel spring 308, according to the present disclosure. The barrel spring 308 may include a first compression surface 310 and a second compression surface 314. The barrel spring 308 may have a longitudinal axis 326, with the first compression surface 310 positioned at a first end of the longitudinal axis 326 and the second compression surface 314 positioned at a second end of the longitudinal axis 326 substantially opposite the first compression surface 310.

The barrel spring 308 may include a plurality of resilient members 328-1, 328-2 oriented generally in the direction of the longitudinal axis 326. In some implementations, the barrel spring 308 may have a first resilient member 328-1 and a second resilient member 328-2 positioned substantially opposite one another (e.g., positioned at 180° intervals) around the longitudinal axis 326. In other implementations, the barrel spring 308 may include other quantities of resilient members positioned between the first compression surface 310 and the second compression surface 314 around the longitudinal axis 326. For example, a barrel spring 308 may include 2, 3, 4, 5, 6, 7, 8, 9, 10, or more resilient members positioned longitudinally between the first compression surface 310 and second compression surface 314.

In some implementations, the resilient members 328-1, 328-2 may deform in a direction perpendicular to the longitudinal direction and consequently reduce in longitudinal length to accommodate a displacement of the first compression surface 310 toward the second compression surface 314 when a compressive force is applied to the barrel spring 308.

In some embodiments, the resilient members 328-1, 328-2 may include any elastic material. For example, the resilient members 328-1, 328-2 may include spring steel. In other examples, the resilient members 328-1, 328-2 may include a shape memory material, such as a shape memory alloy or shape memory polymer, that may allow the barrel spring 308 to provide different forces and exhibit different behavior at different temperatures or upon exposure to different electrical potentials or currents. In further examples, the resilient members 328-1, 328-2 may include composite materials, such as carbon fiber, fiberglass. In some examples, the composite materials may have isotropic properties. In other examples, the composite materials may have anisotropic properties. In yet further examples, the resilient members 328-1, 328-2 may include polymers with sufficient fatigue resistance.

Figure 4:
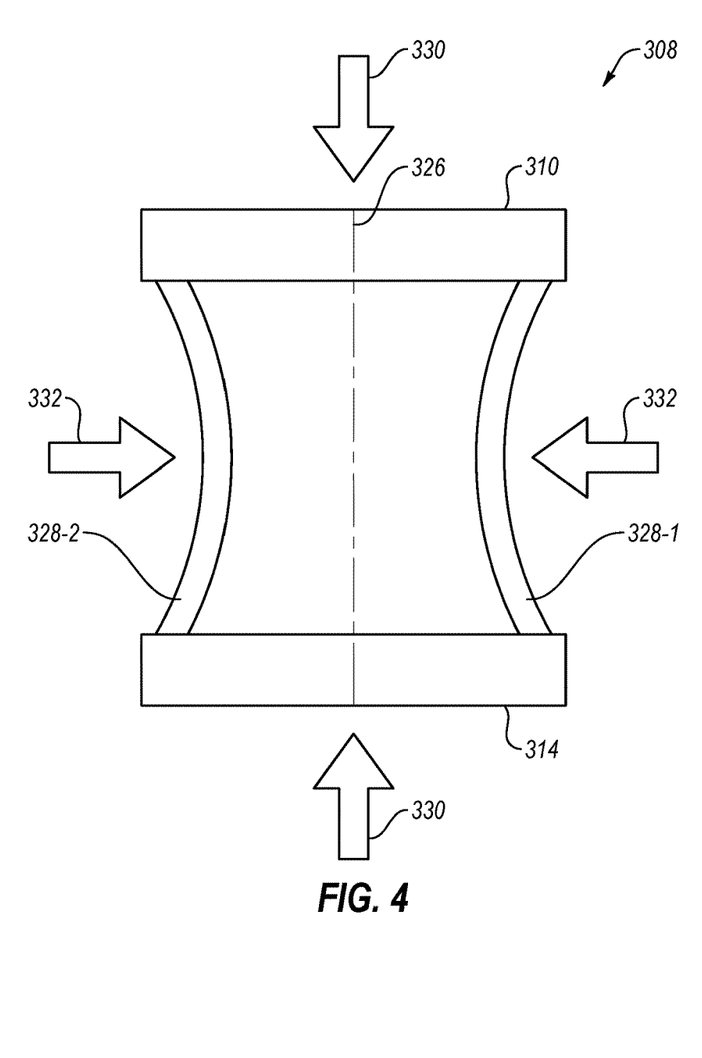
FIG. 4 is a front view of the barrel spring of FIG. 3.

FIG. 4 illustrates a front view of the barrel spring 308 of FIG. 3 experiencing a compressive force 330 in the direction of the longitudinal axis 326. The compressive force 330 acting on the first compression surface 310 and the second compression surface 314 may displace the first compression surface 310 toward the second compression surface 314. The displacement of the first compression surface 310 and the second compression surface 314 toward one another may create a radial deformation 332 or bowing of one or more of the resilient members 328-1, 328-2 inward toward the longitudinal axis 326.

Figure 5:
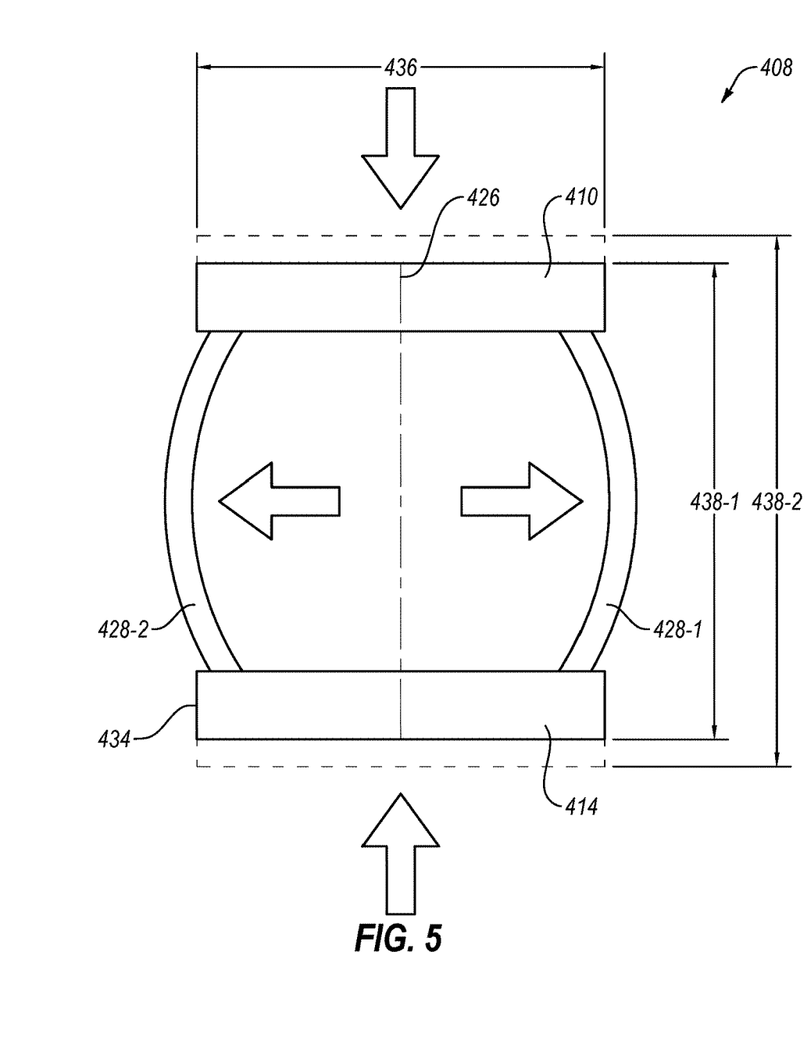
FIG. 5 is a front view of another barrel spring with outward compression.

In other implementations, one or more of the resilient members 328-1, 328-2 may plastically deform or bow outward away from the longitudinal axis. FIG. 5 illustrates a front view of another implementation of a barrel spring 408 in a compressed state. The barrel spring 408 may include resilient members 428-1, 428-2 that deform away from the longitudinal axis 426. In some implementations, the resilient members 428-1, 428-2 may bow outward from the longitudinal axis 426 without moving radially beyond a lateral edge 434 of the first compression surface 410 and/or second compression surface 414. In other implementations, one or more of the resilient members 428-1, 428-2 may have at least a portion that extends radially beyond the lateral edge 434 away from the longitudinal axis 426.

In some implementations, the barrel spring 408 may have a greatest diameter perpendicular to the longitudinal axis 426 when in a compressed state. For example, a barrel spring 408 may have a compressed diameter 436 that is less than 3.0 mm. In other examples, the barrel spring 408 may have a compressed diameter 436 less than 2.5 mm. In yet other examples, the barrel spring 408 may have a compressed diameter 436 less than 2.0 mm.

The barrel spring 408 may have a longitudinal length 438-1, 438-2. The longitudinal length 438-1, 438-2 changes as the barrel spring 408 moves between a compressed state and an expanded state. FIG. 5 illustrates a compressed longitudinal length 438-1 with an expanded longitudinal length 438-2 illustrated in dashed lines for comparison. In some implementations, a compressed longitudinal length 438-1 may be in a range having an upper value, a lower value, or upper and lower values including any of 1.5 mm, 1.7 mm, 1.9 mm, 2.0 mm, 2.1, mm, 2.2 mm, 2.3 mm, 2.4 mm, 2.5 mm, 2.6 mm, 2.7 mm, 2.8 mm, 2.9 mm, 3.0 mm, 4.0 mm, 5.0 mm, 6.0 mm, 8.0 mm, 10.0 mm, or any values therebetween. For example, the compressed longitudinal length 438-1 may be greater than 1.5 mm. In other examples, the compressed longitudinal length 438-1 may be less than 10.0 mm. In yet other examples, the compressed longitudinal length 438-1 may be between 1.5 mm and 10.0 mm. In further examples, the compressed longitudinal length 438-1 may be between 2.0 mm and 5.0 mm. In yet further examples, the compressed longitudinal length 438-1 may be between 2.4 mm and 2.9 mm. In some implementations, it may be critical that the compressed longitudinal length 438-1 is less than 2.9 mm.

In some implementations, an expanded longitudinal length 438-2 may be in a range having an upper value, a lower value, or upper and lower values including any of 1.7 mm, 1.9 mm, 2.0 mm, 2.1, mm, 2.2 mm, 2.3 mm, 2.4 mm, 2.5 mm, 2.6 mm, 2.7 mm, 2.8 mm, 2.9 mm, 3.0 mm, 4.0 mm, 5.0 mm, 6.0 mm, 8.0 mm, 10.0 mm, 12.0 mm, or any values therebetween. For example, the expanded longitudinal length 438-2 may be greater than 1.7 mm. In other examples, the expanded longitudinal length 438-2 may be less than 12.0 mm. In yet other examples, the expanded longitudinal length 438-2 may be between 1.7 mm and 6.0 mm. In further examples, the expanded longitudinal length 438-2 may be between 2.0 mm and 4.0 mm. In yet further examples, the expanded longitudinal length 438-2 may be between 2.4 mm and 2.8 mm. In some implementations, it may be critical that the expanded longitudinal length 438-2 is less than 3.0 mm.

A displacement of the first compression surface 410 and the second compression surface 414 between the compressed length 438-1 and the expanded length 438-2 may be in a range having an upper value, a lower value, or upper and lower values including any of 50 µm, 100 µm, 150 µm, 200 µm, 250 µm, 300 µm, 350 µm, 400 µm, 450 µm, 500 µm, 750 µm, 1000 µm, or any values therebetween. For example, the displacement may be greater than 50 µm. In other examples, the displacement may be less than 1000 µm. In yet other examples, the displacement may be between 50 µm and 1000 µm. In further examples, the displacement may be between 100 µm and 500 µm. In at least one example, the displacement may be about 400 µm. In at least another example, the displacement may be about 200 µm. In some implementations, it may be critical that the displacement is less than 500 µm.

Figure 6:
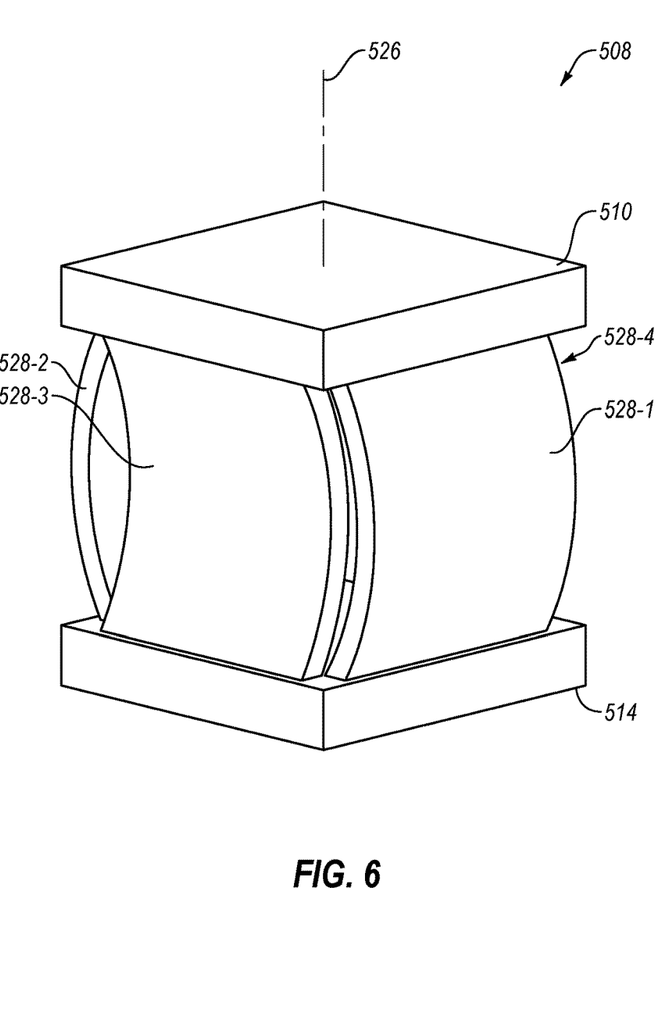
FIG. 6 is a perspective view of yet another barrel spring with mixed compression.

FIG. 6 illustrates an implementation of a barrel spring 508 with four resilient members 528-1, 528-2, 528-3, 528-4 positioned between a first compression surface 510 and a second compression surface 514. In some implementations, at least one of the resilient members 528-1, 528-2, 528-3, 528-4 may bow toward a longitudinal axis 526 and at least one of the resilient members 528-1, 528-2, 528-3, 528-4 may bow away from the longitudinal axis 526. For example, a first pair of the resilient members 528-1, 528-2 may be radially opposite one another relative to the longitudinal axis 526 and each deform outward away from the longitudinal axis 526. A second pair of resilient members 528-3, 528-4 may be radially opposite one another relative to the longitudinal axis 526 and each deform inward toward the longitudinal axis 526. It should be understood that other combinations of resilient members are possible including any quantity or combination of inward and/or outward deforming resilient members.

Figure 7:
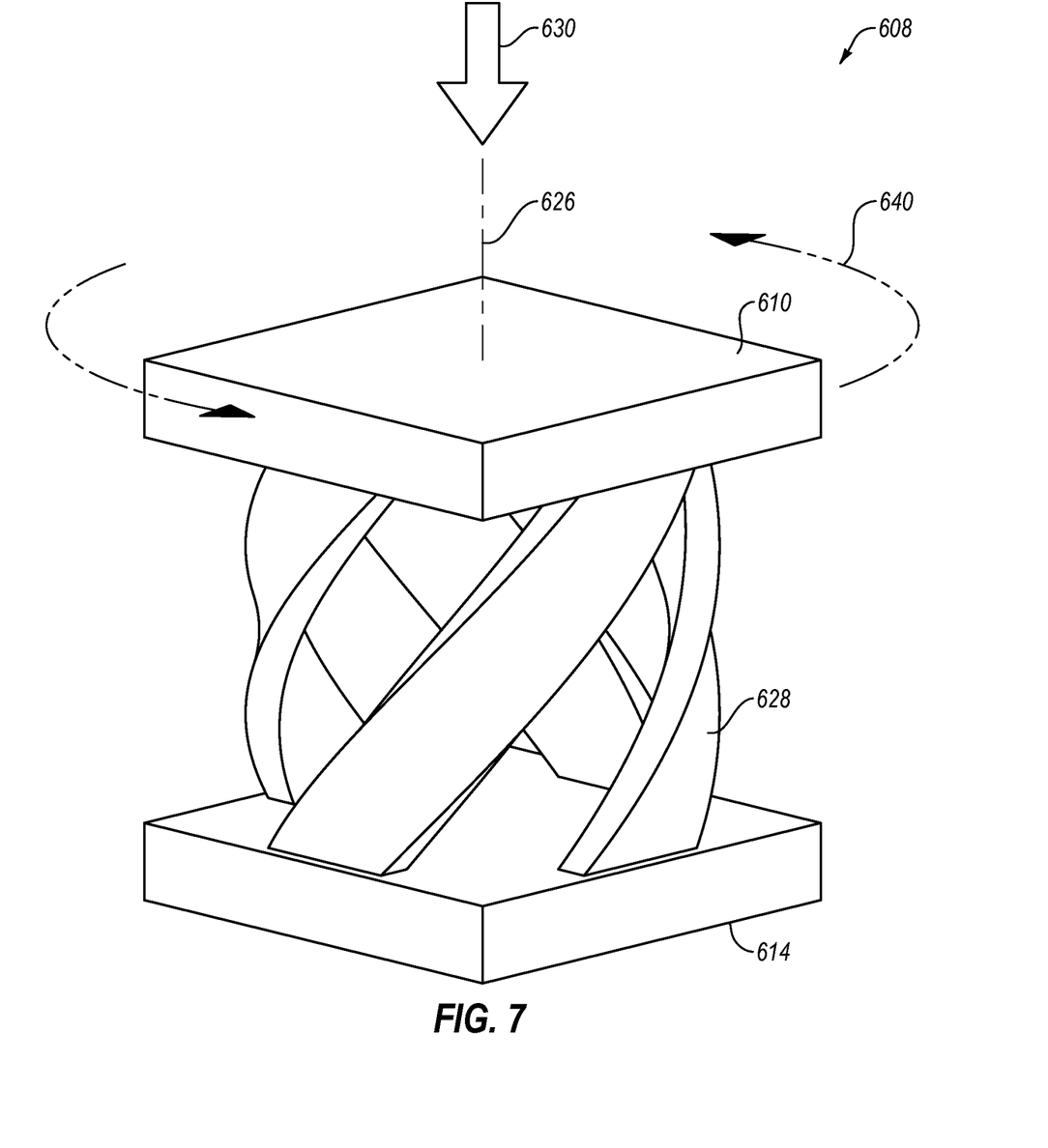
FIG. 7 is a perspective view of a further barrel spring with helical compression.

In other implementations, at least one resilient member of a barrel spring may be oriented such that the resilient member deformed and/or bows in a direction at an angle relative to the radial direction. In other words, the resilient member may bend in a direction that is neither directly toward the longitudinal axis nor away from the longitudinal axis. FIG. 7 is a perspective view of an implementation of a barrel spring 608 with a plurality of resilient members 628 oriented at an angle to the radial direction of the longitudinal axis 626. By orienting the resilient members 628 at an angle to the radial direction, the first compression surface 610 may rotate about the longitudinal axis 626 when the resilient members flex upon compression. In other words, a compressive force 630 may be associated with a rotation 640 of the first compression surface 610 relative to a second compression surface 614. The result may be a helical compression of the barrel spring 608.

Figure 8:
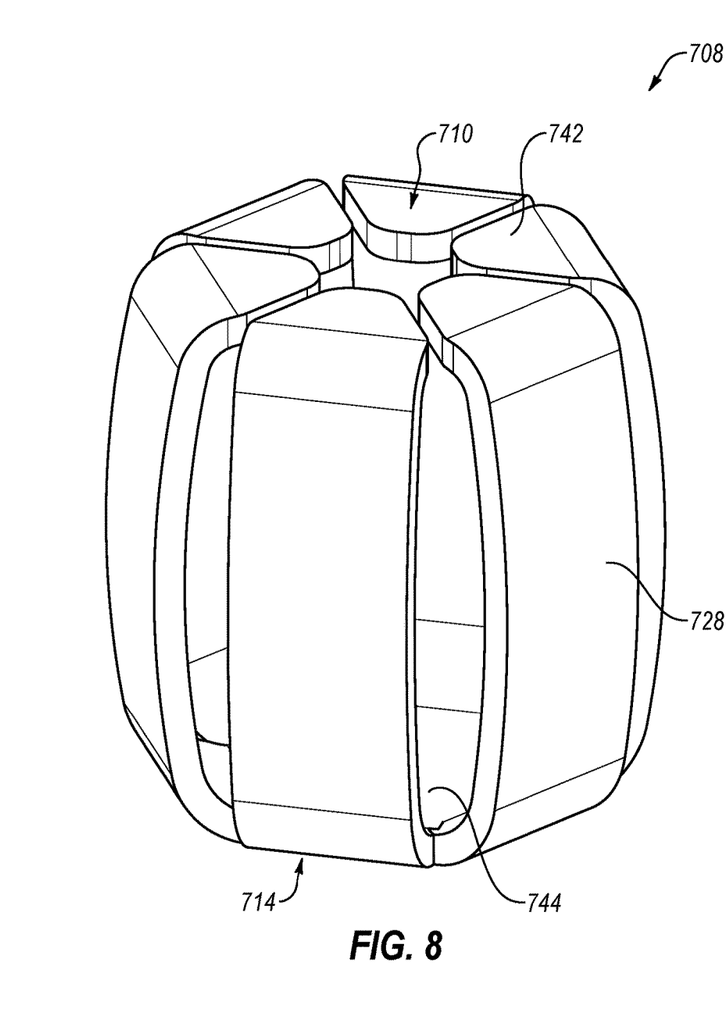
FIG. 8 is a perspective view of yet another barrel spring integrally formed of a single piece.

In some implementations, the first compression surface 610 and second compression surface 614 may be separate components of the barrel spring 608 from the resilient members 628. The first compression surface 610, second compression surface 614, and resilient members 628 may be assembled to form the barrel spring 608. In other implementations, one or more of the first compression surface, second compression surface, and the plurality of resilient members may be integrally formed. For example, FIG. 8 illustrates an implementation of a barrel spring 708 in which all parts of the barrel spring 708 are integrally formed.

In some implementations, one or more portions of a barrel spring 708 may be formed from a single piece of material. For example, a barrel spring 708 may be formed by stamping a sheet of material to plastically deform the material into a barrel spring 708 with a first compression surface 710, a second compression surface 714, and a plurality of resilient members 728 connecting the first compression surface 710 and second compression surface 714. In at least one implementation, the resilient members 728 may each have a plastically deformed first end 742. The first compression surface 710 may be formed by a plurality of first ends 742 of the resilient members 728. In other words, the first end 742 of each of the resilient members 728 may be bent to form a first compression surface 710 that may receive a compressive force and transmit the compressive force to the resilient members 728.

The plurality of resilient members 728 may meet at a junction 744 at a second end of the resilient members 728. The junction 744 may be the second compression surface 714 that is longitudinally opposite the first compression surface 710 formed by the first ends 742 of the resilient members 728. By plastically deforming the resilient members 728 to bend up from the junction 744 and plastically deforming the first ends 742, a single piece of material may be formed into a barrel spring 708 with an integrally formed first compression surface 710, second compression surface 714, and plurality of resilient members 728.

Figure 9:
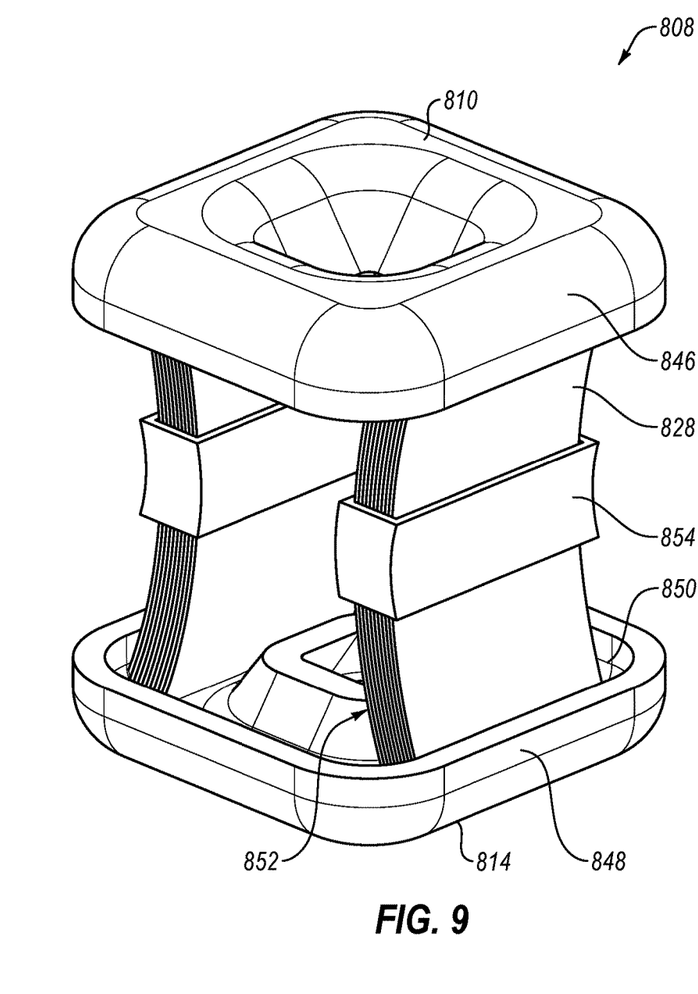
FIG. 9 is a perspective view of a yet further barrel spring with laminated resilient members.

FIG. 9 is a perspective view of another implementation of a barrel spring 808. In some implementations, the first compression surface 810, second compression surface 814, and plurality of resilient members 828 may be separate pieces of material that are held together by a compressive force in the longitudinal direction. For example, the first compression surface 810 may be a first end cap 846, and the second compression surface 814 may be a second end cap 848. At least one of the first end cap 846 and second end cap 848 may have a recess 850 positioned therein that may receive a resilient member 828. The recess 850 may limit and/or prevent movement of an end of the resilient member 828 relative to the first end cap 846 and/or second end cap 848 while the barrel spring 808 is under compression. In at least one implementation, the first end cap 846 and/or second end cap 848 having a recess 850 therein may be part of a frame, link, or other component of a hinge, such as described in relation to FIGS. 2-1 and 2-2.

In some implementations, a barrel spring 808 may include a plurality of resilient members 828 in a stack 852. For example, a stack 852 may include a plurality of resilient members 828 positioned back-to-back such that an inner surface of a resilient member 828 abuts or is adjacent to an outer surface of another resilient member 828. The spring constant of the barrel spring 808 may be adjusted by changing the quantity of resilient members 828 in the stack 852. Furthermore, the resilient members 828 constrained by the recess 850 but not connected to the first end cap 846 and/or second end cap 848 may be able to slide relative to one another during compression of the barrel spring 808 and flexion of the resilient members 828. Sliding relative to one another may allow the resilient members 828 to have a more predictable spring constant, which, in turn, may allow adjustment of the response of the barrel spring 808 to a compressive force.

In some implementations, a stack 852 may be unconstrained proximate the first end cap 846 and/or the second end cap 848. A stack 852 may be bound by a band 854 positioned around the stack 852 of resilient members 828. The band 854 may hold the resilient members 828 in the stack 852 while allowing unconstrained movement of the resilient members 828 relative to one another during elastic deformation of the resilient members 828 of the stack 852.

A resilient member 828 may have a thickness. In some implementations, a thickness of a resilient member 828 may be in a range having an upper value, a lower value, or upper and lower values including any of 5 µm, 8 µm, 10 µm, 20 µm, 30 µm, 50 µm, 100 µm, 150 µm, 200 µm, 250 µm, 300 µm, 400 µm, 500 µm, or any values therebetween. For example, the thickness of a resilient member 828 in a barrel spring 808 may be greater than 5 µm. In other examples, the thickness of a resilient member 828 may be less than 500 µm. In yet other examples, the thickness may be between 5 µm and 500 µm. In further examples, the thickness may be between 8 µm and 250 µm. In at least one example, the thickness of a resilient member 828 may be about 25 µm. In some implementations, it may be critical that the thickness of a resilient member 828 is less than 500 µm.

In some implementations, the thickness may be constant throughout the resilient member 828. In other implementations, the thickness may vary in the longitudinal direction. In yet other implementations, the thickness may vary in a direction transverse to the longitudinal direction. In some implementations, a stack 852 may have a plurality of resilient members 828 that are the same. In other implementations, a stack 852 may include resilient members 828 may have different thicknesses to adjust the response of the barrel spring 808 to a compressive force.

Figure 10:
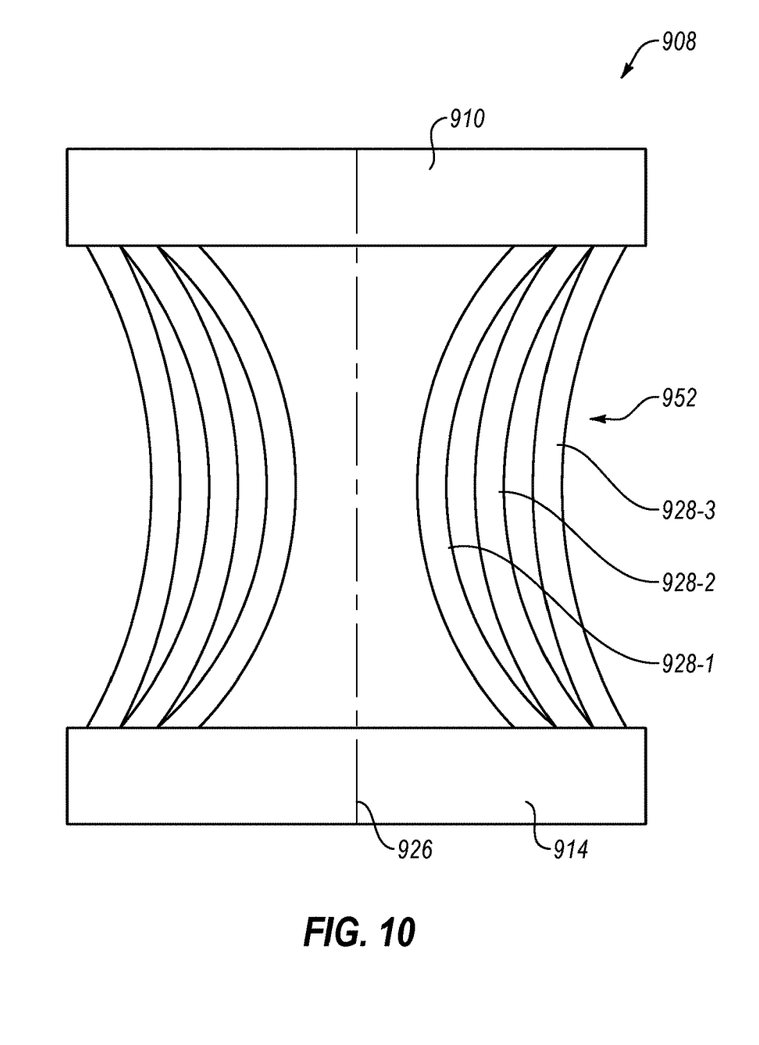
FIG. 10 is a front view of a still further barrel spring with progressive loading.

In other implementations, a stack of resilient members may include resilient members with different lengths, such the resilient members within a stack may experience different amounts of elastic deformation at different points within the longitudinal compression of the barrel spring. FIG. 10 is a front view of an implementation of a barrel spring 908 with a pair of stacks 952 opposite one another relative to a longitudinal axis 926. Each of the stacks 952 includes a first resilient member 928-1, a second resilient member 928-2, and a third resilient member 928-3 where the first resilient member 928-1 is longer than the second resilient member 928-2 which is, in turn, longer than the third resilient member 928-3. The different lengths of the resilient members 928-1, 928-2, 928-3 may allow each of the resilient members 928-1, 928-2, 928-3 to apply a different amount of force to the first compression surface 910 and the second compression surface 914 at any given displacement of the first compression surface 910 and the second compression surface 914.

Figure 11:
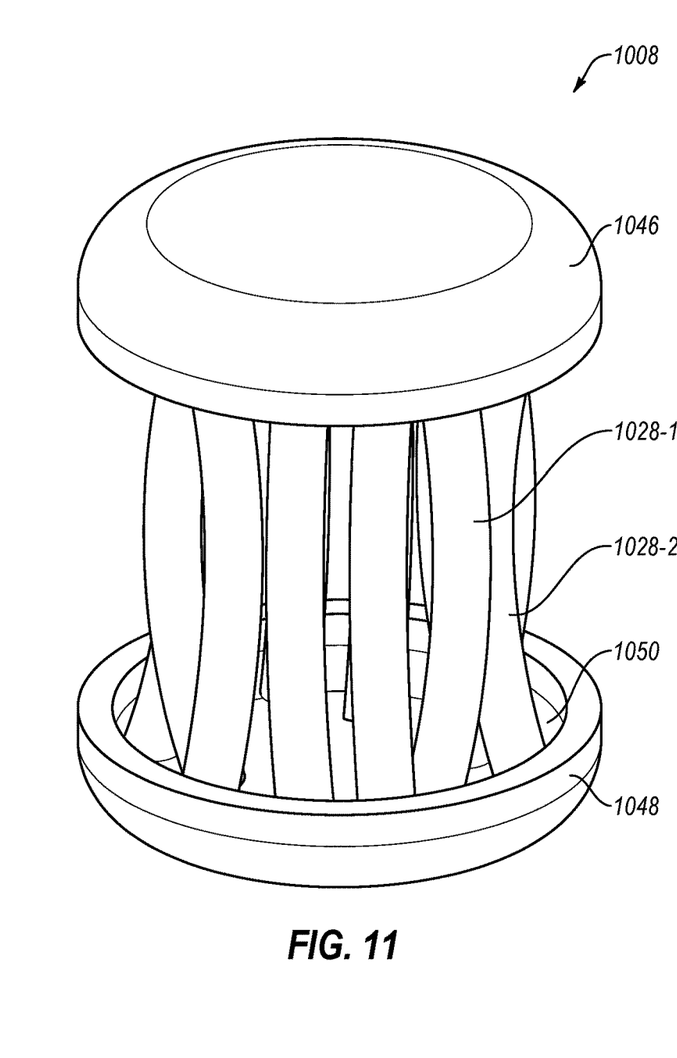
FIG. 11 is a perspective view of a barrel spring with rod resilient members.

While the present disclosure describes resilient members as being sheets of elastic material, in other implementations, the resilient members may have other cross-sectional shapes. FIG. 11 is a perspective view of a barrel spring 1008 with a plurality of resilient members 1028-1, 1028-2 that are rods. In some implementations, the barrel spring 1008 may include at least one outward resilient member 1028-1 and at least one inward resilient member 1028-2. The rod resilient members 1028-1, 1028-2 may be positioned between a first end cap 1046 and a second end cap 1048 with a recess 1050 positioned in the end caps 1046, 1048 to limit and/or prevent the movement of the resilient members 1028-1, 1028-2. Unlike the sheet resilient members, such as described in relation to FIG. 9, the rod resilient members 1028-1, 1028-2 may rotated in the recess 1050, altering the direction of the bow of the resilient members 1028-1, 1028-2. In some implementations, the rod resilient members 1028-1, 1028-2 may be fixed to either the first end cap 1046 and/or the second end cap 1048 to limit and/or prevent rotation of the rod resilient members 1028-1, 1028-2 within the recess 1050 and relative to the first end cap 1046 and second end cap 1048.

In at least one implementation, a barrel spring according to the present disclosure may allow for a greater application of force in a small space than a conventional coil spring. In at least another implementation, a barrel spring according to the present disclosure may provide a longer operational lifetime than conventional Belleville springs by flexing within the elastic deformation regime only.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure.

A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for applying an axial force, the device comprising:
   a longitudinal axis having a first end and a second end;
   a first compression surface positioned at the first end of the longitudinal axis;
   a second compression surface positioned at the second end of the longitudinal axis;
   a plurality of resilient members positioned between the first compression surface and second compression surface, the plurality of resilient members including:
      a first resilient member being oriented with a first end of the first resilient member proximate the first compression surface and a second end of the first resilient member proximate the second compression surface, and
      a second resilient member being oriented with a first end of the second resilient member proximate the first compression surface and a second end of the second resilient member proximate the second compression surface; and
   the device having a compressed state and an expanded state, the first compression surface and second compression surface configured to move in a direction of the longitudinal axis between the compressed state and the expanded state, the device having a spring constant between the compressed state and the expanded state of at least 150 Newtons per millimeter, and the device having a displacement of the first compression surface and second compression surface between the compressed state and the expanded state being less than 500 microns.

2. The device of claim 1, the first resilient member and the second resilient member radially opposing one another relative to the longitudinal axis.

3. The device of claim 1, at least one resilient member of the plurality of resilient members being spring steel.

4. The device of claim 1, at least one resilient member of the plurality of resilient members being a shape memory material.

5. The device of claim 1, the first resilient member configured to deflect toward the longitudinal axis when moving the device from the expanded state to the compressed state.

6. The device of claim 1, the first resilient member having a first length and second resilient member having a second length the first length and second length being different.

7. The device of claim 1, the plurality of resilient members being integrally formed in a single piece of material.

8. A hinge for connecting a first portion and a second portion, the hinge including a device for applying an axial force, the device comprising:
a longitudinal axis having a first end and a second end;
a first compression surface positioned at the first end of the longitudinal axis;
a second compression surface positioned at the second end of the longitudinal axis;
a plurality of resilient members positioned between the first compression surface and second compression surface, the plurality of resilient members including:
a first resilient member being oriented with a first end of the first resilient member proximate the first compression surface and a second end of the first resilient member proximate the second compression surface, and
a second resilient member being oriented with a first end of the second resilient member proximate the first compression surface and a second end of the second resilient member proximate the second compression surface; and
the device having a compressed state and an expanded state, the first compression surface and second compression surface configured to move in a direction of the longitudinal axis between the compressed state and the expanded state, the device having a spring constant between the compressed state and the expanded state of at least 150 Newtons per millimeter, and the device having a displacement of the first compression surface and second compression surface between the compressed state and the expanded state being less than 500 microns.

9. The device of claim 8, the displacement of the first compression surface and second compression surface between the compressed state and the expanded state being between 100 microns and 500 microns.

10. The device of claim 9, the displacement of the first compression surface and second compression surface between the compressed state and the expanded state being about 400 microns.

11. The device of claim 9, further comprising a compressed diameter of less than 3 millimeters.

12. The device of claim 9, further comprising an expanded length in a longitudinal direction of less than 3 millimeters.

13. The device of claim 8, the plurality of resilient members experiencing elastic deformation in the compressed state and the expanded state.

14. The device of claim 8, an inner surface of the first resilient member and an outer surface of the second resilient member abutting.

15. The device of claim 14, further comprising a band positioned around at least a portion of the first resilient member and second resilient member.

16. The device of claim 14, the first resilient member having a thickness less than 10 microns.

17. The device of claim 8, the first resilient member being uncoupled from the first compression surface.

18. A system for movably coupling two structures, the system comprising:
a shaft having a rotational axis;
a protrusion extending from the shaft in a radial direction perpendicular to the rotational axis;
a link in contact with the protrusion, the link being positioned to contact a side surface of the protrusion and apply a torque to the shaft;
a barrel spring contacting the link and configured to apply a force to the link toward the shaft, the barrel spring comprising:
a longitudinal axis having a first end and a second end;
a first compression surface positioned at the first end of the longitudinal axis;
a second compression surface positioned at the second end of the longitudinal axis;
a plurality of resilient members positioned between the first compression surface and second compression surface, the plurality of resilient members including:
a first resilient member being oriented with a first end of the first resilient member proximate the first compression surface and a second end of the first resilient member proximate the second compression surface, and
a second resilient member being oriented with a first end of the second resilient member proximate the first compression surface and a second end of the second resilient member proximate the second compression surface; and
the barrel spring having a compressed state and an expanded state, the first compression surface and second compression surface configured to move in the direction of the longitudinal axis between the compressed state and the expanded state, a displacement of the first compression surface and second compression surface between the compressed state and the expanded state being less than 500 microns, a spring constant between the compressed state and the expanded state being at least 150 Newtons per millimeter.

19. The system of claim 18, wherein the shaft is rotationally fixed relative to a first portion of an electronic device, the link being fixed relative to a second portion of an electronic device.

20. The system of claim 18, a compressed diameter being less than 3 millimeters, and an expanded length in a longitudinal direction being less than 3 millimeters.

* * * * *